Figure 2:
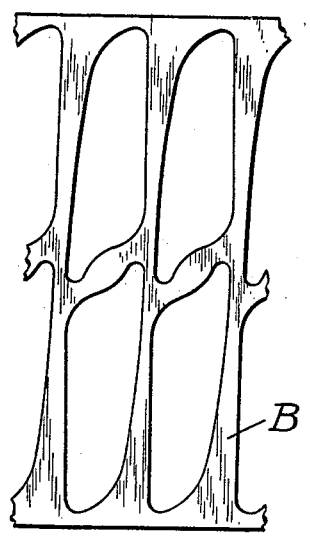

J. W. FRANKLIN.
DIE FOR CUTTING OUT PARTS OF SHOE UPPERS.
APPLICATION FILED NOV. 3, 1909.

999,981.

Patented Aug. 8, 1911.
2 SHEETS—SHEET 1.

WITNESSES.
C. G. Bradley.
J. H. Thurston.

INVENTOR.
James W. Franklin
By Wilmarth H. Thurston
ATTORNEY.

J. W. FRANKLIN.
DIE FOR CUTTING OUT PARTS OF SHOE UPPERS.
APPLICATION FILED NOV. 3, 1909.
999,981.
Patented Aug. 8, 1911.
2 SHEETS—SHEET 2.
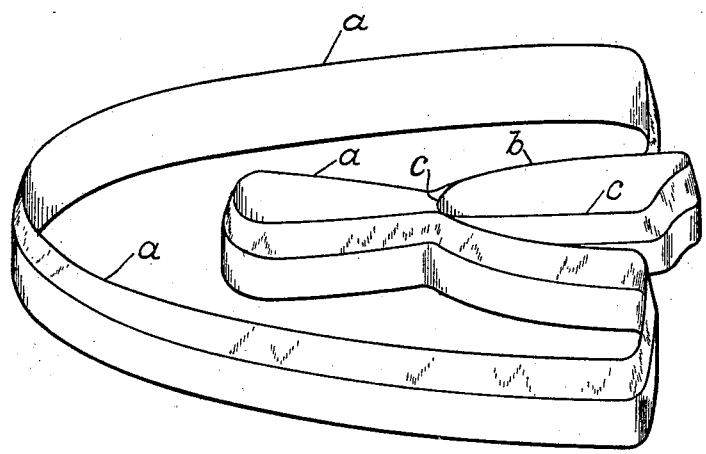
Fig. 4.
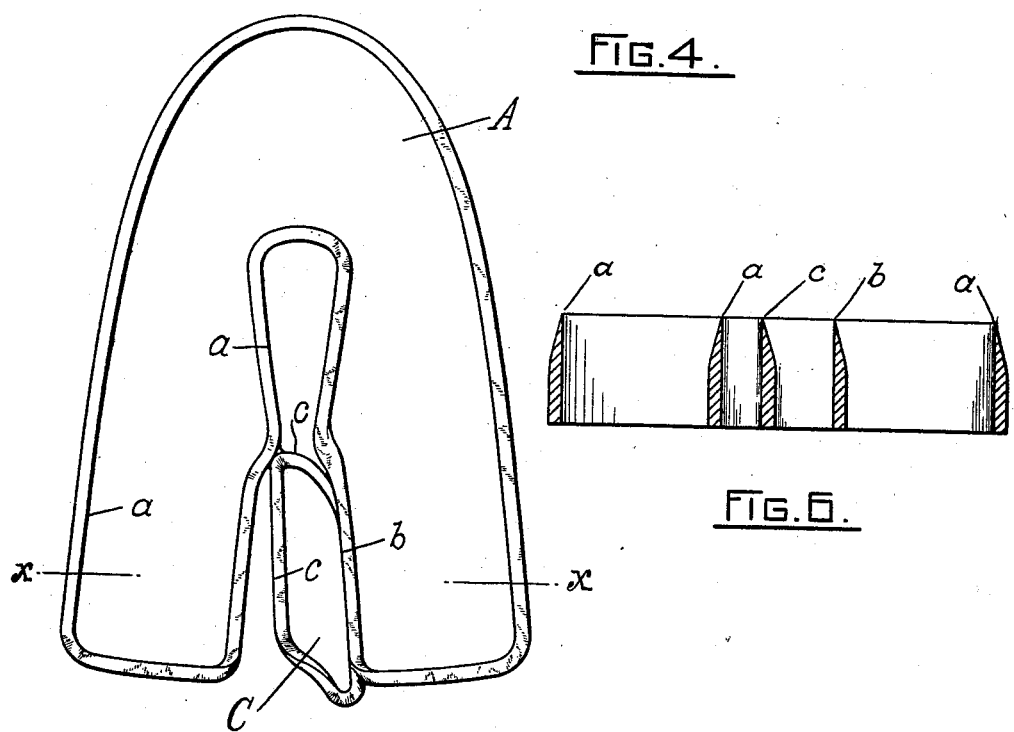
Fig. 5.
Fig. 6.
WITNESSES.
C. G. Bradley
J. H. Thurston.
INVENTOR.
James W. Franklin,
By Wilmarth H. Thurston,
ATTORNEY.

UNITED STATES PATENT OFFICE.

JAMES W. FRANKLIN, OF BRISTOL, RHODE ISLAND.

DIE FOR CUTTING OUT PARTS OF SHOE-UPPERS.

999,981.     Specification of Letters Patent.     Patented Aug. 8, 1911.

Application filed November 3, 1909. Serial No. 525,989.

*To all whom it may concern:*

Be it known that I, JAMES W. FRANKLIN, of Bristol, in the county of Bristol and State of Rhode Island, have invented certain new and useful Improvements in Dies for Cutting Out Parts of Shoe-Uppers; and I do hereby declare the following specification, taken in connection with the accompanying drawings, forming a part of the same, to be a full, clear, and exact description thereof.

The present invention relates to a die for cutting out the parts which go to make up the upper of a shoe, the die shown in the accompanying drawings being especially designed and adapted for cutting out the parts composing the upper of a tennis-shoe. The upper of such a shoe is composed of four parts, viz., a top, two gussets, and a tongue.

Heretofore the several parts referred to have each been cut by a separate die, although as the two gussets are counterparts of each other, both of said gussets might be cut by the same die successively, and so that, although the cutting of the four parts might thus be effected by the use of three separate dies, four successive cutting operations were necessary, one for each of the four parts of the upper. Not only were four successive cutting operations required, but there was a large percentage of waste of material due to the irregular shapes of the parts, and this waste was especially great in connection with the cutting of the tops. While in the cutting of the gussets and the tongues some saving of material could be and was effected by alternately reversing the position of the cutting die with relation to the material, there was still a considerable amount of waste in the cutting of the gussets and tongues in addition to the large amount of waste involved in the cutting of the tops.

The object of the present invention is to reduce the number of cutting operations required in cutting out the four parts of the upper, and also to reduce the percentage of waste of the material from which the parts are cut.

To that end the invention consists in a novel die constructed and adapted to simultaneously cut out both the top and one of the gussets, the construction of the die being such that said gusset is cut from what would otherwise be waste material.

Figure 3:
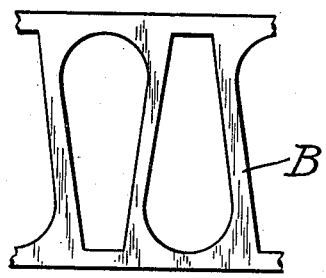
Figure 1:
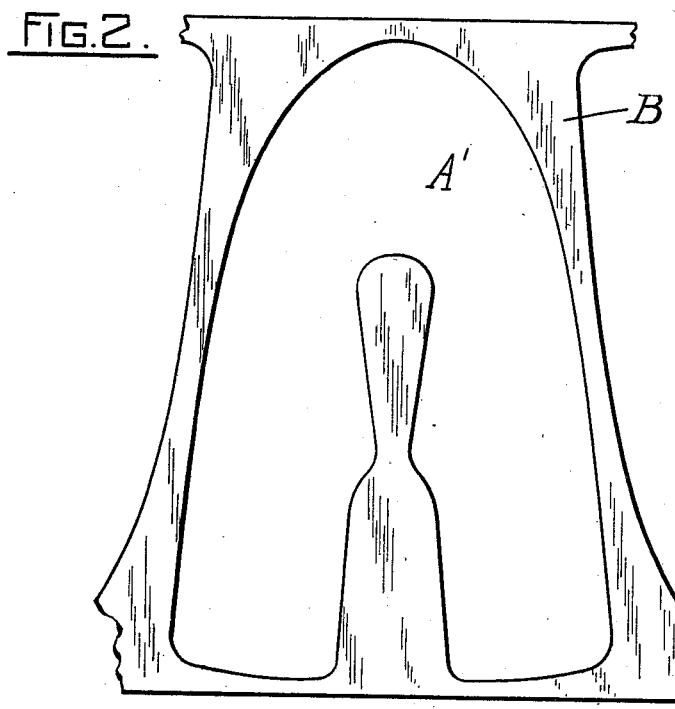

Referring to the drawings, Figure 1 is a plan view showing where a top has been cut from a sheet of material, said view showing the shape of the top of the die heretofore employed for cutting the same. Fig. 2 is a plan view showing the manner of cutting the gussets from a sheet of material, said view showing the shape of the gussets and of the die for cutting the same. Fig. 3 is a plan view showing the manner of cutting the tongues from a sheet of material, said view showing the shape of the tongues and of the die for cutting the same. Fig. 4 is a perspective view of my new die, with the cutting edges uppermost. Fig. 5 is a plan view of the same, and Fig. 6 is a transverse section on the line $x$—$x$ of Fig. 5.

A represents the die as a whole. The main portion of said die is provided with a cutting edge $a$, and is constructed and adapted to cut a top of substantially the same form or shape as was cut by the top die heretofore employed, as indicated by the space A' in Fig. 1, where a top has been cut out from the material B by one of the old top dies.

My new die is provided with a supplemental portion C provided with a cutting edge $a$ of a suitable shape to cut a gusset, the wall of said supplemental portion being formed integral with the wall of the main or top cutting portion of the die. As will be seen, there is a cutting edge $b$ which is common to both the main and supplemental portions of the die, and said supplemental or gusset cutting portion of the die is so located and arranged that the gusset cut thereby will be cut from what is necessarily waste material when the old top cutting die is employed.

With my new die, as will be seen, the top and one of the gussets will be simultaneously cut, thereby reducing the number of cutting operations from four to three. At the same time, as above stated, the gusset will be cut from what would otherwise be waste material. It is to be further noted that with the employment of my new die there is in fact a double saving of material effected. Thus not only is the gusset cut from what would otherwise be waste material, but there is the further saving of the clear stock from which said gusset would otherwise have to be cut, with the accompanying marginal waste incident to the cutting of such gusset from clear stock. It is to be understood that the other gusset and the tongue are to be cut by separate dies and by separate cutting operations, as heretofore.

What I claim as my invention and desire to secure by Letters Patent is:

A die for cutting out the parts of a shoe-upper consisting of a cutter having the outline of the top, and a gusset die of dissimilar shape lying substantially within the compass of, but external to, the top die and formed partly of the same, partly of an attached supplemental cutting edge, as set forth.

JAMES W. FRANKLIN.

Witnesses:
W. H. THURSTON,
J. H. THURSTON.

Copies of this patent may be obtained for five cents each, by addressing the "Commissioner of Patents, Washington, D. C."